Dec. 27, 1955
H. L. OSWALT
2,728,283
TURF PERFORATOR
Filed Dec. 1, 1951
3 Sheets-Sheet 1
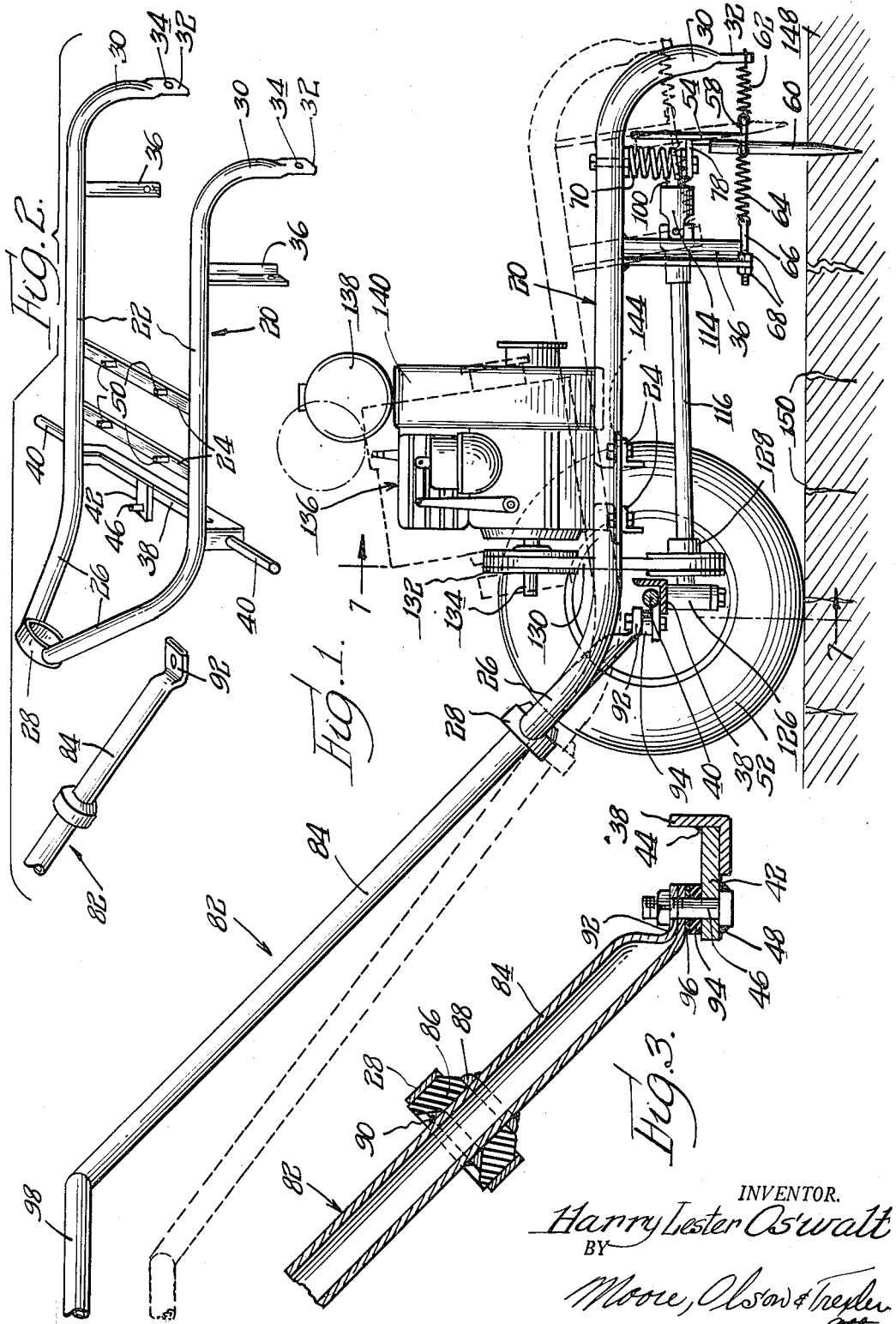
INVENTOR.
Harry Lester Oswalt
BY
Moore, Olson & Trexler
Attys

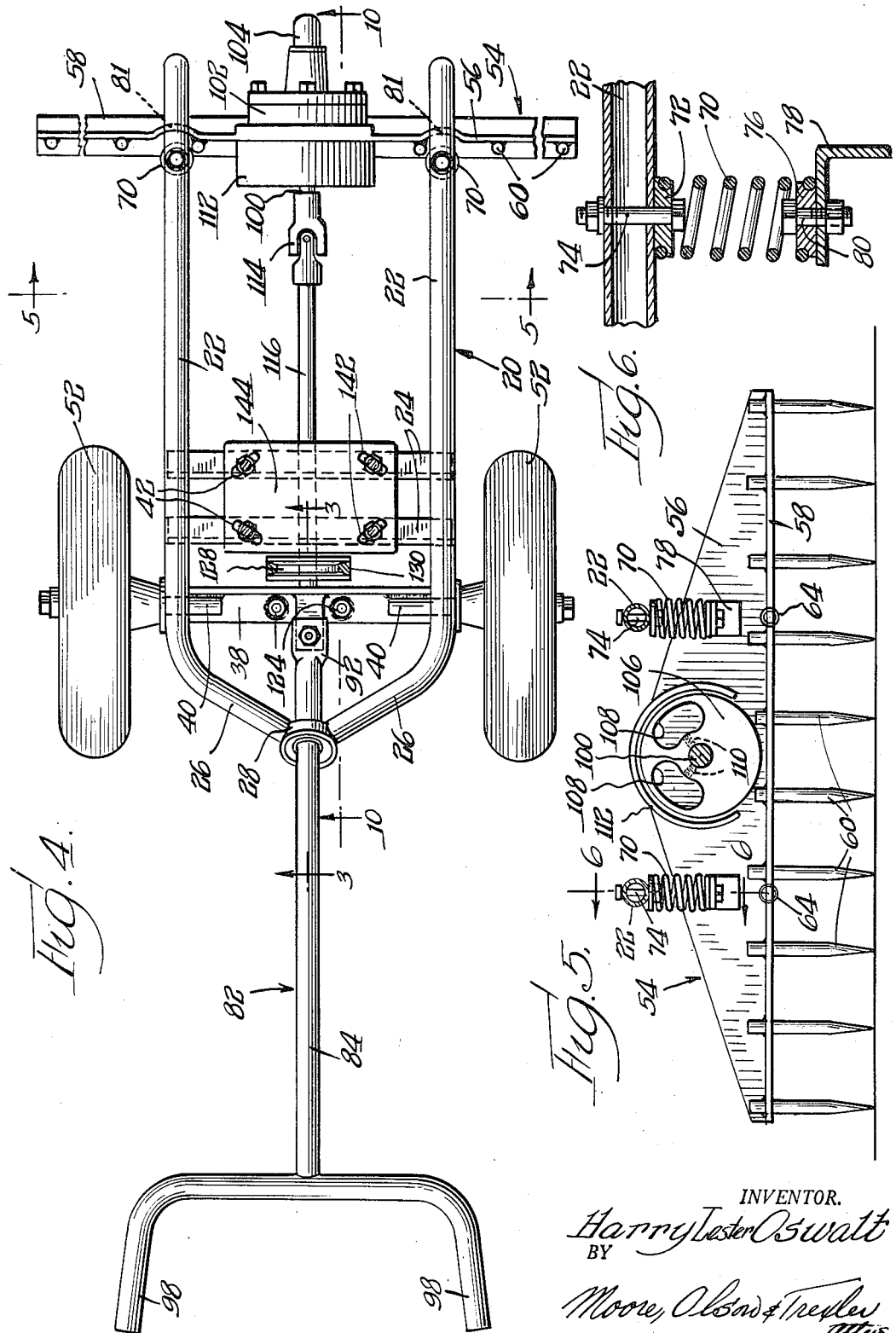

Dec. 27, 1955
H. L. OSWALT
2,728,283
TURF PERFORATOR
Filed Dec. 1, 1951
3 Sheets-Sheet 3
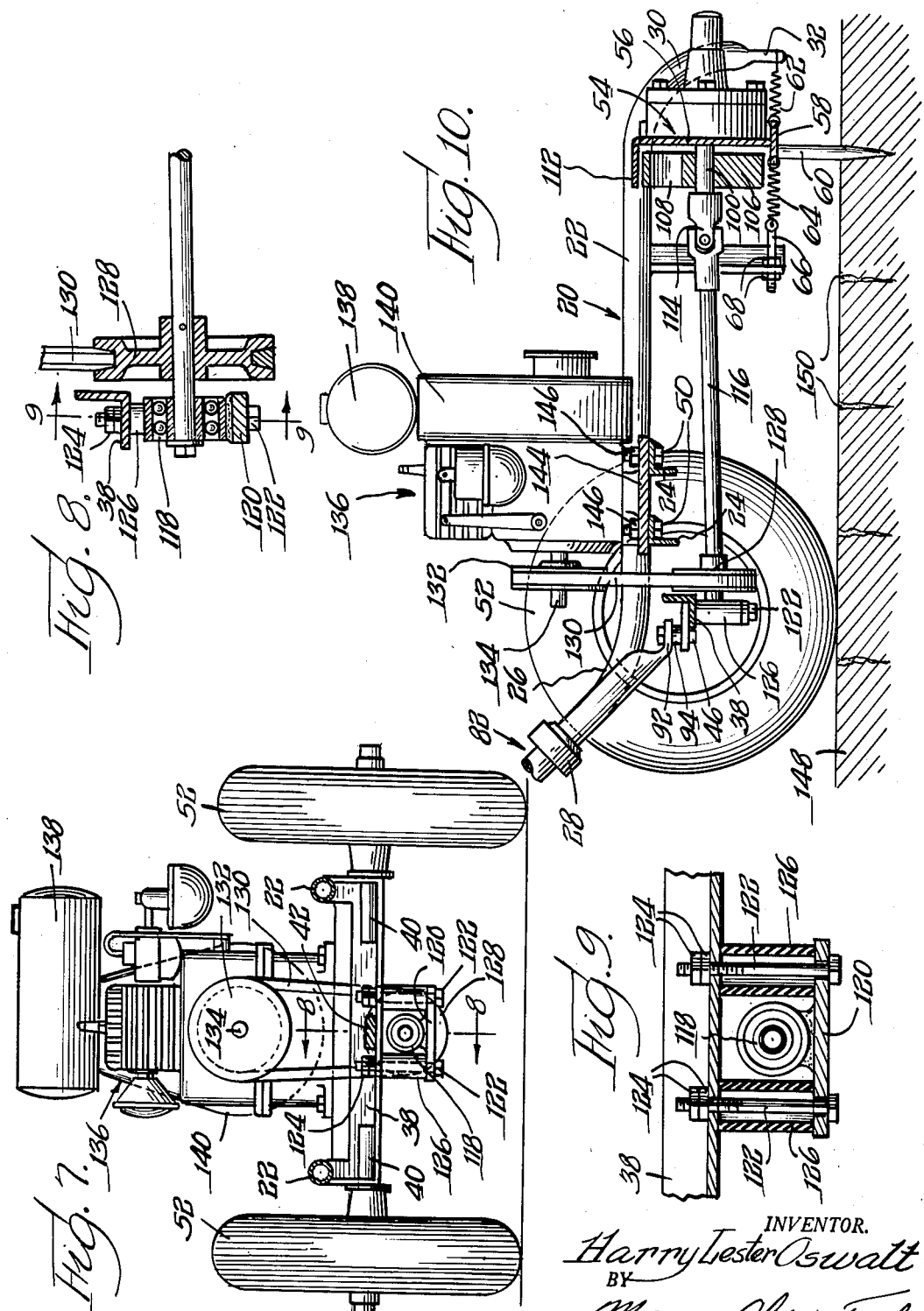
INVENTOR.
Harry Lester Oswalt
BY
Moore, Olson & Trexler
attys.

United States Patent Office 2,728,283
Patented Dec. 27, 1955

2,728,283
TURF PERFORATOR
Harry Lester Oswalt, Garden City, Kans.
Application December 1, 1951, Serial No. 259,442
7 Claims. (Cl. 97—34)

This invention is concerned with a surface cracking machine, specifically a vibrating machine for loosening soil and the like and for cracking up ice on sidewalks, roads, etc.

In many localities where winds and hot sun are found finely divided top soil blows on to turf and sod and forms a substantially impenetratable crust. When the crust is wet slightly and then baked in the sun it becomes well nigh impervious. The problem is particularly acute in the Central Plains States of the United States during the summertime, and seeding, watering, fertilizing, and aeration thus are made very difficult.

In many areas of the world, again including the Central Plains States of the United States, ice forms on sidewalks, roadways, and the like in wintertime and makes travel difficult and hazardous. The surface presented by the ice is in some respects similar to that of the baked top soil crust in that it is very hard and practically impervious.

In temperate climates the problem of top soil crust is encountered in the summertime and the problem of ice on sidewalks and roadways is encountered in the wintertime. The desirability of a single apparatus to overcome both problems and thereby to have substantially year-around use is obvious.

An object of this invention is to provide a home size, hand operated apparatus for perforating and cracking turf and ice.

For aeration, fertilization, watering, and seeding of turf the turf ideally should have a plurality of holes extending straight into the ground and interconnected by fine line cracks. The turf or sod should not have large holes ripped therein and should not be turned over in part as this would damage or destroy vegetation already present. In order most effectively to crack up ice the surface of the ice should be attacked at substantially right angles and not at a shallow acute angle which would tend to cause the penetrating mechanism to skid along the surface. The turf perforating and ice cracking problems just enumerated are solved concurrently by the provision of a floating carrier or platform carrying a plurality of vertical spikes. The spikes are lowered substantially straight into the surface and the carrier or platform is vigorously vibrated to aid in penetrating the surface and further to break up the surface.

An object of this invention is to provide a wheeled apparatus having a vibrating spike carrying platform or carrier wherein positioning and guiding handles for the apparatus are substantially rigid with the platform or carrier supporting mechanism to facilitate tipping the apparatus to raise or lower the spikes substantially vertically.

A further object of this invention is to provide an apparatus as set forth in the foregoing object wherein the handles are joined to the platform through cushioning means lessening or eliminating physical shocks transmitted to the handles but insuring substantial rigidity of the handles relative to the supporting mechanism.

Another object of this invention is to provide a novel floating support for the spike carrying platform or carrier.

Other and further objects and advantages of the present invention will be apparent from the following description when taken in connection with the accompanying drawings wherein:

Fig. 1 is a side view of an apparatus embodying the principles of my invention, the right wheel being removed for clarity of illustration;

Fig. 2 is an exploded perspective view of the supporting frame and handle;

Fig. 3 is a longitudinal secitonal view of the handle in assembled position as taken substantially along the line 3—3 of Fig. 4;

Fig. 4 is a top view of the apparatus;

Fig. 5 is a transverse view partially in section taken along the line 5—5 of Fig. 4 and showing the spike carrier;

Fig. 6 is a sectional view along the line 6—6 of Fig. 5 and showing the novel floating suspension of the spike carrier;

Fig. 7 is a transverse view partly in section taken along the line 7—7 of Fig. 1;

Fig. 8 is a vertical sectional view taken along the line 8—8 of Fig. 7;

Fig. 9 is a vertical sectional view at right angles to Fig. 8 and taken along the line 9—9 of Fig. 8; and Fig. 10 is a longitudinal sectional view taken along the line 10—10 of Fig. 4.

Referring first to Figs. 1, 2, and 4 for a general understanding of my apparatus, there may be seen a frame 20 formed of tubular material and including a pair of normally horizontal side members 22 spaced apart in parallel relation by a pair of angle members 24 suitably secured thereto by means such as bolts or welding. The rear ends of the longitudinal side members 22 continue integrally as angularly disposed members 26 extending upwardly and converging toward one another. The angularly disposed members have their upper ends welded or otherwise suitably secured to a cylindrical collar 28. The longitudinal side members 22 are completed by downwardly extending front ends 30 flattened at their lower extremities 32 and provided with apertures 34.

The frame 20 further includes a pair of depending angle irons 36 near the front and substantially parallel to the downwardly extending front ends 30. A U-shaped angle member 38 extends between the longitudinal side members 22 near the rear thereof and is provided with laterally extending stub shafts or axles 40 which preferably are welded to the U-shaped angle member 38. The U-shaped angle member 38 is provided at its center with a rearwardly extending strap 42 which preferably is welded in place at 44 (Fig. 3) and which carries an upstanding bolt 46 which likewise preferably is welded in place at 48. The only parts of the frame 20 not heretofore enumerated are four bolts 50 extending upwardly from the transverse angle members 24 and preferably welded in place.

Conventional pneumatic tired wheels 52 are rotatably mounted on the stub shafts or axles 40 by any suitable known means for supporting and transporting the apparatus.

A spike carrying platform or spike carrier 54 is supported beneath the forward ends of the longitudinal side members between the downwardly extending front ends 30 and the depending angle members 36 and comprises a vertical wall 56 (Fig. 5) relatively high to the center and tapering downwardly toward both ends. A horizontal flange 58 extending forwardly and rearwardly along the bottom of the carrier is provided with a plurality of apertures in which spikes 60 are welded in place. Springs 62 extend forwardly from apertures in the carrier flange 58 to the apertures 34 in the downwardly extending front ends 30 of the frame and similar springs 64 extend rearwardly from apertures in the flange 58 to bolts 66 fitting through apertures in the downwardly extending angle arms 36. Nuts 68 are threaded on the bolts 66 on either side of the angle arms 36 to afford longitudinal adjustment of the bolts for centralizing the carrier.

Vertical support for the spike carrier 54 is provided by a pair of coil springs 70 (Figs. 1, 4, 5 and 6) secured to the under sides of the longitudinal side members 22 by means of spring retaining members 72 threaded into the top ends of the springs and held against the longitudinal side members 22 by nuts and bolts 74. Spring retaining members 76 are threaded into the lower ends of the springs 70 and are held against angle brackets 78 by nuts and bolts 80. The angle brackets 78 in turn are welded or otherwise suitably fixed to the vertical wall 56 of the spike carrier 54. Vertical sections of the wall 56 are displaced at 81 to provide clearance for the springs 70. The end members 72 and 76 threaded into the springs 70 afford greater lateral stability than the conventional looped spring ends.

Means is provided for lifting and lowering the front end of the frame and hence for raising the spikes from the ground and lowering the spikes to the ground. This means comprises a handle 82 (Figs. 1-4 and 10) having a shaft 84 fitting through the collar 28 at the rear end of the frame. A frusto-conical rubber ring 86 is trapped on the handle shaft 84 by a pair of bands or rings 88 and 90 welded thereto. The ring 86 preferably is stretched just slightly in fitting over the handle shaft 84 and has its exterior compressed for reception in the collar 28. The lower end of the handle shaft 84 is flattened and bent into a horizontal position as at 92 and is apertured to fit over the bolt 46, a rubber pad or washer 94 being interposed between the mounting plate 42 and a steel washer 96 beneath the flat end 92 of the handle 82.

A substantially U-shaped upper portion on the handle 82 provides a pair of handle grips 98 which are generally horizontally disposed. Downward pressure on the handle grips 98 pivots the machine about the axis of the wheels 52 to lift the spikes from the ground and release of the handle grips effects lowering of the spikes to the ground. The connection between the handle 82 and frame 20 is sufficiently rigid to eliminate lost motion for all practical purposes, but the rubber ring 86 and rubber pad or washer 94 largely prevent the transfer of vibrations from the frame 20 to the handle 82. Vibrations on the handle are most undesirable as they quickly fatigue the operator. A rearwardly extending stub shaft 100 (Figs. 1, 4, 5, and 10) is journaled in a suitable bearing contained in a housing 102 and having a grease cap 104, which housing is suitably fixed to the front side of the vertical plate 56 of the spike carrier 54. An eccentric fly wheel 106 (Figs. 5 and 10) is fixed on the stub shaft 100 for rotation therewith. The fly wheel preferably is circular in outline and is mounted concentrically with the stub shaft 100, but is eccentrically weighted by virtue of a pair of apertures 108. Set screws 110 may be threaded inwardly from the apertures 108 to engage the stub shaft 100 to fix the fly wheel 106 on the stub shaft. Rotation of the eccentric fly wheel causes vibration of the carrier 54 and spikes 60 up and down and also laterally of the machine to facilitate entry of the spikes into a surface and to crack the surface after the spikes enter. Means is provided in the form of an arcuate cover plate 112 welded on the carrier 54 to prevent injury to anyone who might approach the fly wheel while the fly wheel is rotating.

The stub shaft 100 is connected by means of a universal joint 114 (Figs. 1, 4, and 10) to a shaft 116 which has its opposite end journaled in ball bearing 118 (Figs. 8 and 9). The ball bearing 118 is welded to a mounting plate 120 which is suspended from the transverse U-shaped angle member 38 of the frame by means of a pair of bolts 122 passing through the plate 120 and through the horizontal flange of the U-shaped angle member 38. A pair of nuts 124 is threaded on the upper end of each bolt 122 and the nuts of each pair are jammed together to lock them in adjusted position on the bolts. The plate 120 is spaced from the angle member 38 by short lengths of rubber hose 126 which conveniently may be common garden hose. The bolts 122 fit relatively loosely through the plate 120 and this loose fit coupled with the resilient sections of rubber hose 126 allows the plate 120 to move up and down slightly and to tilt longitudinally of the machine.

A pulley 128 is fixed on the shaft 116 immediately forward of the bearing 118 and is driven by a belt 130 passed over the pulley 128 and over a pulley 132 on the output shaft 134 of an internal combustion engine 136. The engine 136 preferably is a conventional air cooled gasoline engine and is supplied with gasoline from a tank 138 mounted on top of the engine fly wheel housing 140. The engine is mounted by means of the bolts 50 on the transverse angle member supports 24. These bolts pass upwardly through slots 142 (Fig. 4) in a motor mounting plate 144 (Figs. 1, 4, and 10) which is held down by suitable nuts 146 threaded on the bolts 50.

In Figs. 1 and 10 the machine is shown in operation for perforating the ground 148 to form holes 150 therein. The motor 136 runs constantly and acts through the belt 130 and shaft 116 to rotate the eccentric fly wheel 106, which in turn vibrates the spike carrier 54 and spikes 60 with an up and down and sidewise motion. A downward push on the handle grips 98 raises the frame 20 to the position shown in dashed lines in Fig. 1 with little effort as the motor 136 which constitutes most of the weight on the frame, is located relatively near the axis of the wheels 52. The machine then is rolled along the ground a short distance depending upon the character of the ground and pressure on the hand grips 98 gradually is released to lower the frame 20 and thereby to bring the spikes into contact with the ground. The spikes are relatively sharp and the vibration eases them into the ground with little pressure. The substantially longitudinal movement of the spikes avoids tearing the ground and leaving large holes and the constant vigorous vibration of the spikes vigorously vibrates the ground to leave loose internal surfaces in the spike holes 150 without the formation of the hard packed internal surfaces generally formed by driving a pointed instrument into the ground. The continuous vigorous vibration of the ground also serves to loosen the ground between spike holes and to form minute cracks between the holes. The spike holes and minute cracks open up the ground for aeration, watering, fertilizing, or seeding without imparting the appearance of the turf and without killing any vegetation already present. After a suitable time the handle grips 98 again are pushed down to raise the spikes from the ground to move to a succeeding location.

The operation of the machine for breaking ice is exactly the same. The substantially longitudinal movement of the spikes into the ice prevents the spikes from skidding along the surface and cracks the ice transversely into pieces that are readily pushed or shoveled aside.

Although a specific example of my invention has been shown and described and two major uses have been disclosed, it is apparent that the invention may take other forms and has many other uses. Therefore, it is to be understood that the invention includes all that which falls fairly within the spirit and scope of the appended claims.

I claim:

1. Apparatus for loosening material comprising a frame, a pair of wheels rotatably mounted substantially at the rear of said frame for transporting said frame along a surface, a plurality of spikes carried by said frame adjacent the front end thereof for perforating said surface, means for vigorously vibrating said spikes to aid in penetrating said surface and for loosening the material of said surface, a substantially cylindrical collar at the rear of said frame and having its axis directed upwardly and rearwardly, a mounting member carried by said frame forwardly of said collar and substantially aligned therewith, a handle having a shaft extending through said collar, vibration damping means interposed between said shaft and said collar, means for securing said shaft substantially at the end thereof to said mounting member, and vibration damping means interposed between said shaft and said mounting member, said handle serving to pivot said frame about said wheels to move said spikes to and from said surface.

2. Apparaus for loosening material comprising a frame, a plurality of wheels rotatably mounted on said frame substantially at the rear thereof for transporting said frame along a surface, a carrier, a plurality of substantially straight, sharpened spikes on said carrier for spiking into said surface, substantially vertically disposed spring means for supporting said carrier from said frame adjacent the front end thereof substantially free for restrained movement in any direction, substantially horizontally disposed spring means exerting force substantially horizontally between said carrier and said frame for controlling movement of said carrier, means for vigorously vibrating said carrier and said spikes to aid in spiking into said surface and for loosening the material of said surface, a drive shaft extending from said vibrating means, bearing means for the end of said drive shaft disposed remotely relative to said vibrating means, means providing a floating suspension for supporting said bearing means from said frame and handle means secured to said frame substantially at the rear end thereof and extending rearwardly from said frame, said handle means being substantially rigid with said frame for pivoting said frame about said wheels to move said spikes to and from said surface substantially longitudinally of said spikes.

3. Apparatus for loosening material comprising a frame, a motor on said frame and having a rotatable drive member on its output shaft, a pair of wheels rotatably mounted on said frame for transporting said frame along a surface, a carrier, a plurality of spikes on said carrier for perforating said surface, spring means supporting said carrier from said frame, means on said carrier for vigorously vibrating said carrier and said spikes, a drive shaft extending from said vibrating means, rotatable drive means on said drive shaft, endless flexible means interconnecting the rotatable drive means on said drive shaft and the rotatable drive member on the output shaft of said motor, bearing means for the end of said shaft disposed remotely relative to said vibrating means, and floating suspension means for supporting said bearing means from said frame, said floating suspension means including a base plate fixed to said bearing means, a plurality of suspension members loosely interconnecting said base plate and said frame, and a plurality of resilient spacers each encircling said suspension members for maintaining a predetermined spacing between said base plate and said frame.

4. Apparatus for loosening material comprising a frame, a plurality of wheels rotatably mounted on said frame substantially at the rear end thereof for transporting said frame along a surface, a carrier, a plurality of spikes on said carrier for perforating said surface, spring means interconnecting said carrier and said frame for supporting said carrier substantially free for restrained movement in any direction, an eccentric fly wheel rotatably mounted about a substantially horizontal axis on said carrier for vigorously vibrating said carrier and said spikes to aid in penetrating said surface and for loosening the material of said surface, an elongated drive shaft, a universal joint on one end of said drive shaft for rotating said eccentric fly wheel, a rotatable drive member adjacent the other end of said drive shaft, a floating bearing for said other end of said drive shaft and supported from said frame, a motor on said frame, a rotary drive member on the output shaft of said motor, endless flexible drive means interconnecting said rotary drive member and said rotatable drive means, a handle substantially rigid with said frame and extending upwardly and rearwardly substantially from the rear end of said frame for pivoting said frame about said wheels to move said spikes to and from the ground, and vibration damping means interposed between said handle and said frame for preventing transfer of mechanical vibrations from said frame to said handle.

5. Apparatus for loosening material as set forth in claim 1 and further including a floating support carried by said frame and on which said spikes are mounted.

6. Apparatus for loosening material as set forth in claim 5 and further including spring means mounting said floating support on said frame.

7. Apparatus for loosening material and comprising a frame having side members with downwardly extending front ends and depending angle irons relatively closely spaced in rear thereof, a plurality of wheels for transporting said frame above a surface, a carrier comprising a transversely extending substantially vertical plate disposed between the front ends of the frame and the angle irons, a plurality of spikes on said carrier for perforating said surface, substantially vertically disposed spring means suspending said carrier from said frame substantially free for restrained movement in any direction, substantially horizontally disposed spring means connecting the front ends of said frame and the angle irons with said carrier and exerting substantially horizontal force between said carrier and said frame for controlling movement of said carrier, means for vigorously vibrating said carrier and said spikes to aid in spiking into said surface and for loosening the material of said surface and including a stub shaft normal to the plane of said plate and journaled therein and carrying a flywheel, and handle means substantially rigid with said frame for pivoting said frame about said wheels to move the spikes to and from said surface substantially longitudinally of the said spikes.

References Cited in the file of this patent

UNITED STATES PATENTS

| | | |
|---|---|---|
| Re. 20,663 | Cameron | Mar. 1, 1938 |
| 2,020,119 | Langley | Nov. 5, 1935 |
| 2,068,828 | Tustain | Jan. 26, 1937 |
| 2,224,506 | Baily | Dec. 10, 1940 |
| 2,517,733 | Takats | Aug. 8, 1950 |
| 2,613,582 | Harshberger | Oct. 14, 1952 |
| 2,641,982 | Harshberger | June 16, 1953 |

FOREIGN PATENTS

| | | |
|---|---|---|
| 441,228 | Great Britain | Jan. 15, 1936 |